United States Patent [19]
Rogov

[11] Patent Number: 5,312,076
[45] Date of Patent: May 17, 1994

[54] REFLEX SUPPORT FASTENER FOR KEYBOARD STANDS

[76] Inventor: Vladymir Rogov, 6162 Nancy Ridge Dr., #101, San Diego, Calif. 92121

[21] Appl. No.: 880,679

[22] Filed: May 8, 1992

[51] Int. Cl.⁵ ............................................. F16M 11/24
[52] U.S. Cl. ..................................... 248/165; 84/177; 211/189; 248/163.1
[58] Field of Search ............... 248/676, 166, 165, 434, 248/163.1; 211/189, 195, 206, 182; 108/153, 157; 84/177

[56] References Cited

U.S. PATENT DOCUMENTS

| | | | |
|---|---|---|---|
| 3,854,783 | 12/1974 | Teranishi | 108/153 X |
| 4,331,312 | 5/1982 | Lsvoe | 84/177 X |
| 4,422,385 | 12/1983 | Rutsche | 108/153 |
| 4,684,091 | 8/1987 | Moreschi | 248/166 |
| 4,691,885 | 9/1987 | Lawrance | 108/153 X |
| 4,748,913 | 6/1988 | Favaretto | 108/153 X |
| 4,911,086 | 3/1990 | Belknap | 248/165 X |
| 5,033,902 | 7/1991 | Lechner | 403/254 |

Primary Examiner—J. Franklin Foss
Attorney, Agent, or Firm—Brown, Martin, Haller & McClain

[57] ABSTRACT

A reflex fastener, specifically a snap consisting of a plug and corresponding socket, is disclosed for use in load-bearing structures (preferably, stands to support electronic keyboards). The plug is bevelled to form depressions into which corresponding engagement ridges in the socket will be seated when the structure is fully assembled. The plug and socket are also sloped or curved at corresponding angles which enhance the stability of the assembled structure. Ease of assembly and disassembly is enhanced without loss of stability by constructing the fastener by blow-molding a rigid, flexible material.

A keyboard stand of unique appearance and stability which incorporates the inventive fastener is also disclosed.

12 Claims, 3 Drawing Sheets

REFLEX SUPPORT FASTENER FOR KEYBOARD STANDS

BACKGROUND OF THE INVENTION

1. Field of the Invention

This invention relates to fasteners for attaching and stabilizing two or more components of a load-bearing structure. Although focus is directed to use of the fastener in a support stand for musical instruments, specifically electronic keyboards, it will be understood that the fastener would be useful in any number of load-bearing structures where it is important for the fastened components to be able to resist detachment under load (thus providing a stable support structure), yet also be easily detached when not under load to allow the support structure to be separated into its individual components for storage or relocation.

2. Description of the Prior Art

Support stands for musical instruments such as electronic keyboards are widely available in a variety of designs and materials, the latter most commonly being metal or wood. However, certain features must be present in all free-standing keyboard stands. For example, the stand must raise the instrument to a height sufficient for it to be played, and will therefore usually have relatively long legs. At the same time, it is desirable to have the stand be portable, usually meaning it will be made of a lightweight material formed into several sections—legs, keyboard support and arms—which may be fastened together in a way which will allow the end consumer to take them apart to be moved or stored. In addition, for aesthetic purposes, it is desirable for a keyboard stand to be streamlined in design so as to be in proportion visually to the typically narrow, elongated keyboards which they will support.

The combination of long legs, streamlined design and detachable components has resulted in keyboard stands which are inherently unstable (i.e., likely to tip over or collapse under load).

Prior art stands have approached these problems in a variety of ways. Stand components have, for example, been welded together, fastened with nuts and bolts, or nailed and/or glued in place. None of these fastening means have been altogether satisfactory because they either result in a stand with is different or impossible to disassemble or do not reliably stabilize the stand when in use.

A need, therefore, exists for a fastener which may be easily detached when the stand is not in use, but is nonetheless resistant to decoupling when the stand is in use. A need further exists for a keyboard stand which uses such a fastener to secure its support components together in a way that will enhance the stability of the stand under load. The fastener must also be strong enough to provide sufficient support for the keyboard which, along with the keyboard stand, is typically mounted on an elongated bridge between the legs of the stand without any intermediate support.

SUMMARY OF THE INVENTION

The invention meets the needs identified above and consists, in one aspect, of a unique resilient fastener, specifically a reflex snap comprising a plug and socket which are angled and beveled to resist detachment of the snap and the components it secures. In the preferred embodiment of the invention, the snap is constructed of a blow-molded, flexible plastic.

The invention more broadly consists of a keyboard stand of unique composition and design which incorporates and is assembled with the inventive fastener.

DESCRIPTION OF THE PREFERRED EMBODIMENTS

Figure 1:
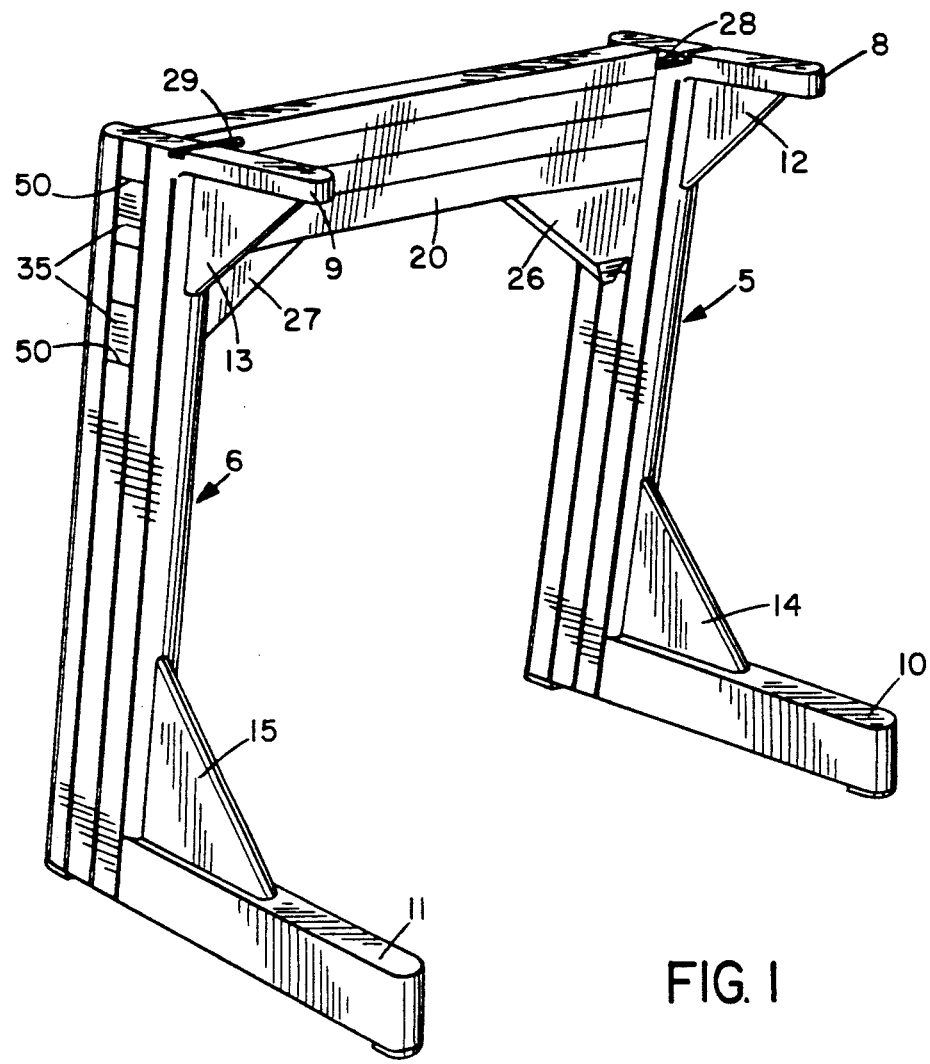
FIG. 1 is a perspective view of the keyboard stand.

FIG. 1 depicts a keyboard stand assembled with the inventive fastener. The keyboard stand is unique with respect to prior art stands in that its primary individual components—legs 5 and 6 and cross-bar keyboard bridge 20—are composed of a molded (and preferably blow-molded) acrylonitrile butadine sytrene resin plastic (which material will hereafter be referred to by its common name, "a-b-s resin plastic") or material having equivalent resilience and strength. The selection of this material is dictated by the requirement that, once blow-molded, it must be resilient, i.e., sufficiently flexible to allow the fastener to function in the manner described below, while being sufficiently rigid to provide support.

Legs 5 and 6 each extend laterally in the same direction at both their proximal and distal ends to form, respectively, upper support arms 8 and 9 as well as lower support arms 10 and 11. To enhance the comfort of the musician while playing, legs 5 and 6 may be tilted slightly forward in the direction of extension of arms 8, 9, 10 and 11. The angle of this tilt may be as much as 20° from vertical, but 10° is preferred as the snap will reflect the same angles and is most stable at 80° from horizontal. Triangular flanges 12 and 13 provide further load-bearing support at the point of attachment of support arms 8 and 9 to the legs; similar flanges 14 and 15 provide load-bearing support at the joint between legs 5 and 6 and support arms 10 and 11. Triangular support flanges 26 and 27 also extend from the lower surface of keyboard bridge 20 and the inner surfaces of legs 5 and 6.

Figure 2:
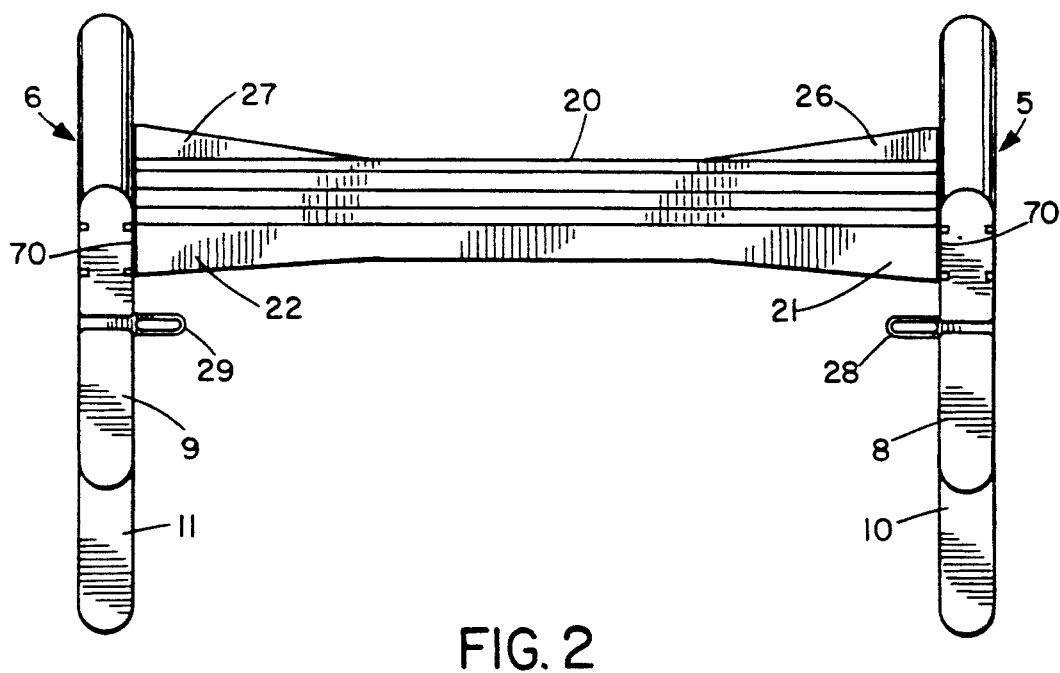
FIG. 2 is a top plan view of the keyboard stand.
Figure 4:
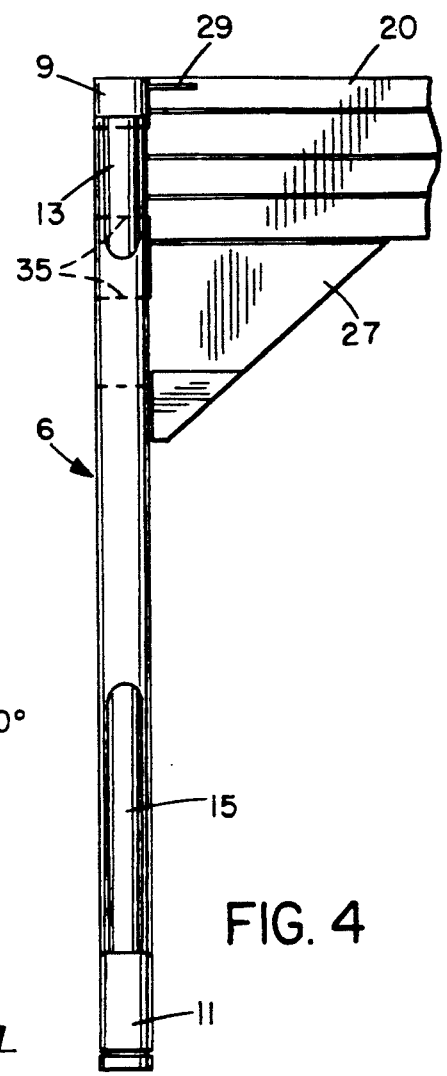
FIG. 4 is a front elevational view of one end of the structure.

Extending between the proximal ends of legs 5 and 6 is an elongated cross-bar keyboard bridge 20. Keyboard bridge 20 is attached at either of its ends to legs 5 and 6 at their inner surfaces by the inventive fastener. Although it will be appreciated by those skilled in the art that, exclusive of flanges and extensions, legs 5 and 6 and keyboard support 20 are generally rectangular in shape in front view (FIG. 4), other shapes may also be used. As shown in FIG. 2, keyboard bridge 20 is enlarged laterally at ends 21 and 22 to provide a plane on which to rest the keyboard.

Figure 3:
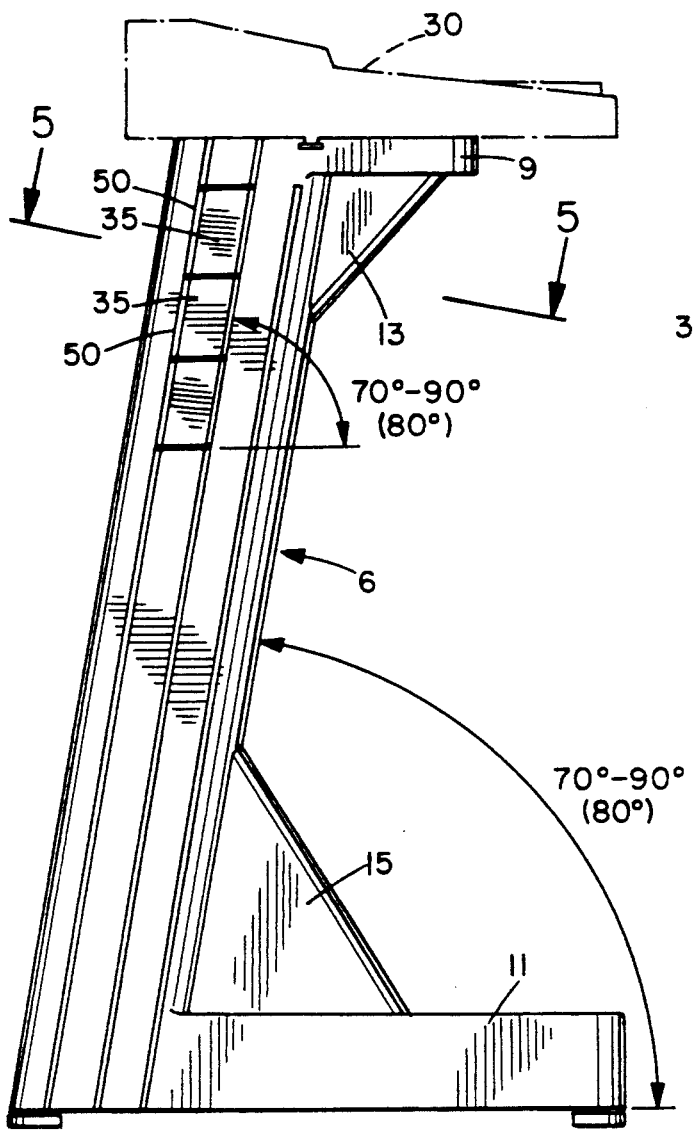
FIG. 3 is an end elevational view, with a typical keyboard indicated in broken line.

Bracket mounts are shown at 28 and 29 in FIG. 2 and secure the keyboard to the stand by insertion of a bolt therethrough and into the keyboard. Other means of keyboard attachment, such as slot and tab insertion, may also be used depending on the manufacture and design of the keyboard to be placed on the stand. A side elevational view of leg 5 showing an exemplary keyboard 30 secured by bracket mounts 26 and 27 is depicted in FIG. 3.

Figure 5:
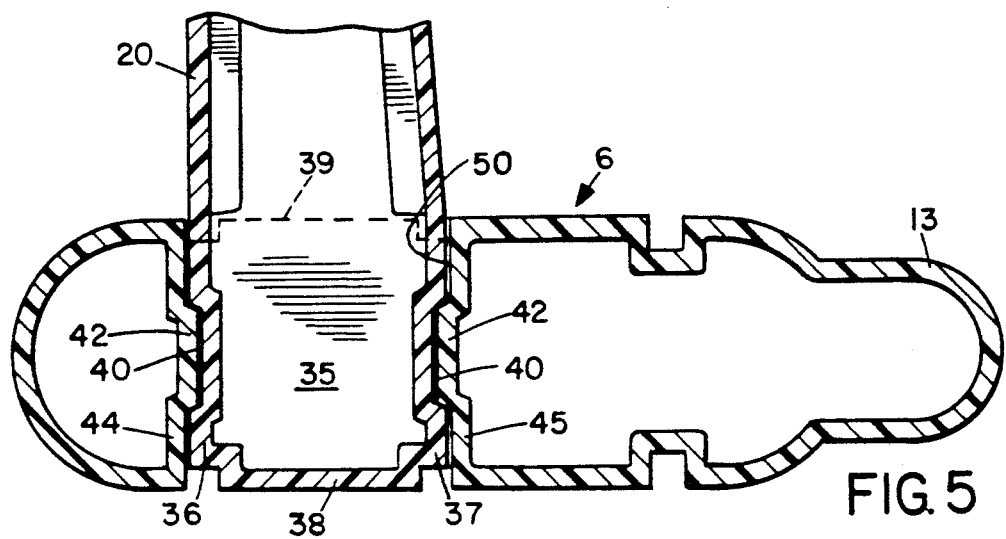
FIG. 5 is an enlarged sectional view taken on line 5—5 of FIG. 3.
Figure 6:
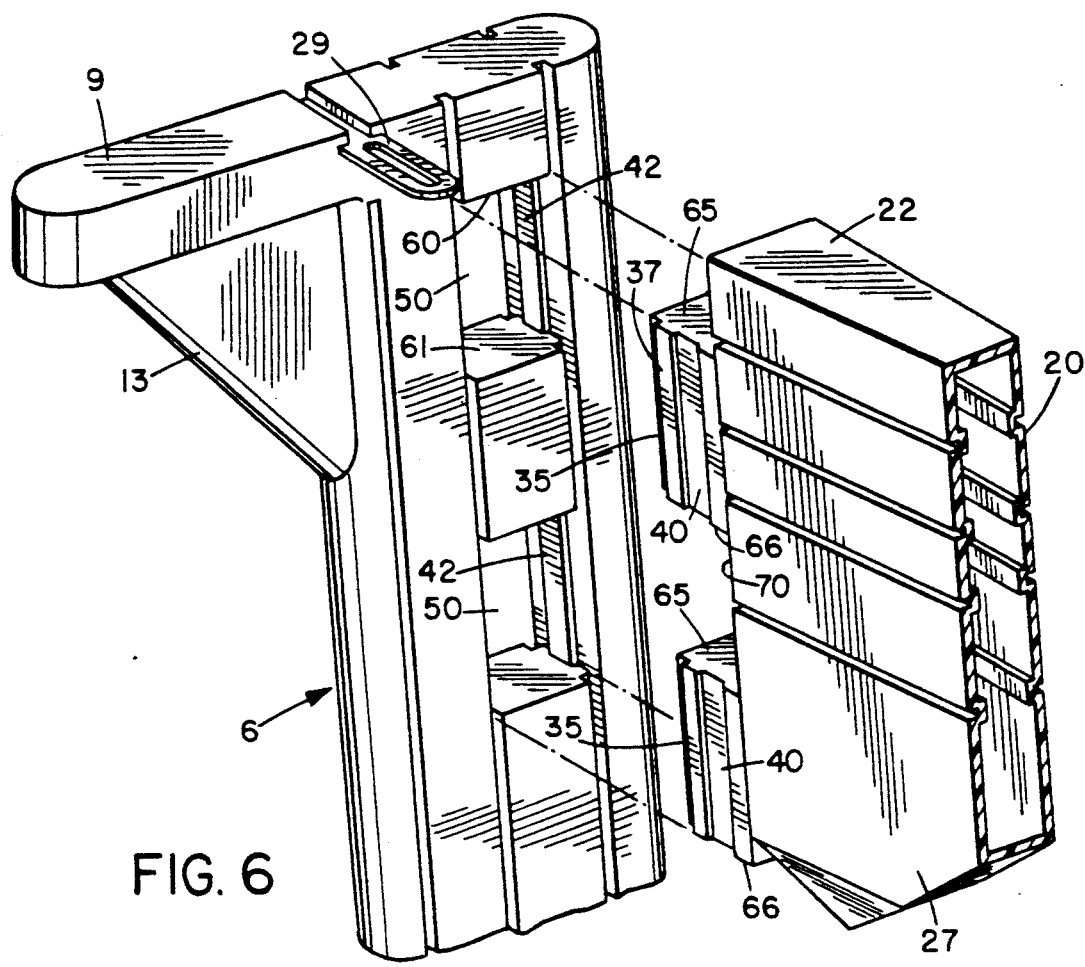
FIG. 6 is a perspective view showing the plug and socket connection of the keyboard to a leg.

The inventive fastener is shown in FIG. 5 in a locked position. The snap consists of a substantially hollow plug 35 which extends from, and as a molded extension of, keyboard bridge 20 at each of its end walls 70 (which end walls are best shown in FIG. 6). Plug 35 has at least two parallel walls 36 and 37 (as used in the keyboard stand), as well as an end wall 38 which connects and seals the hollow space between walls 36 and 37. Line 39 defines the conceptual inner boundary of plug 35.

Sidewalls 36 and 37 are each bevelled by forming a depression during manufacture substantially in the center of the width of each wall (by, for example, blow-molding plastic from a mold having a preformed ridge therein). Referring to the bevelling in side wall 36 as exemplary of the bevelling in both side walls, the depression 40 extends in depth from the top edge to the bottom edge of side wall 36 and is itself bounded by side walls 40A and 40B connected at the floor of the depression by face 40C. The ration of width of depression 40 with respect to the total surface the area of side wall 36, is optimally 1:3; however, the ratio between the width of the depression and the total width of side wall 36 may vary, as may the number of depressions in each side wall.

Referring to leg 6 shown in FIG. 5, the snap further consists of socket 50 (see FIGS. 6 and 7) which is bounded horizontally by end walls 60 and 61 and side walls 44 and 45. One or more blow-molded engagement ridges (shown at 42) in leg 6 which are equal in size and number, and correspond in position to depression 40, are formed in side walls 44 and 45. Referring for purposes of illustration to engagement ridge 42 as exemplary of all of the engagement ridges, the ridge consists of side walls 42A and 43B, as well as face 42C. As depicted in FIG. 5, these side walls are optimally sloped or curved at an angle of less than 90° of vertical from face 42C. This slope or curvature will be complementary to a corresponding slope in side walls 40A and 40B of depression 40 at an angle of more than 90° of vertical from depression face 40C.

This configuration provides the greatest resistance to detachment of the snap while providing for ease of assembly as described below. It will be appreciated, however, that ridge 42 and depression 40 could be adapted to provide greater resistance to detachment (by, for example, increasing the frictional resistance to detachment through providing ribs along ridge face 42C corresponding to slots in valley face 40C or vice versa) with a corresponding reduction in the ease of assembly.

FIG. 6 depicts the detached plug and socket connection, showing a pair of snaps for attachment of the keyboard bridge 20 to leg 6. While a pair of snaps is shown and preferred, any number of one or more snaps could be used depending on the desired degree of support and manufacturing cost.

As described above, in the preferred embodiment of this invention, legs 5 and 6 will be tilted forward at an angle of 70°-80° (FIG. 3), although the legs may also extend upward a right angle to the keyboard (i.e., 90° from horizontal). The preferred embodiment, however, enhances the comfort of the keyboardist in playing as well as the aesthetic appeal of the stand.

When horizontal boundary walls 60 and 61 of socket 50 are also angled to the same degree and direction as legs 5 and 6 (so as to be parallel to support arms 8,9,10 and 11; see, FIG. 3), the corresponding horizontal boundary walls 65 and 66 of plug 35 will be similarly angled with respect to keyboard support end wall 70 from which plug or plugs 35 extend (FIG. 6). This configuration provides for the greatest stability achieved by stand in that the load is carried uniformly at all stress points therein.

Figure 7:
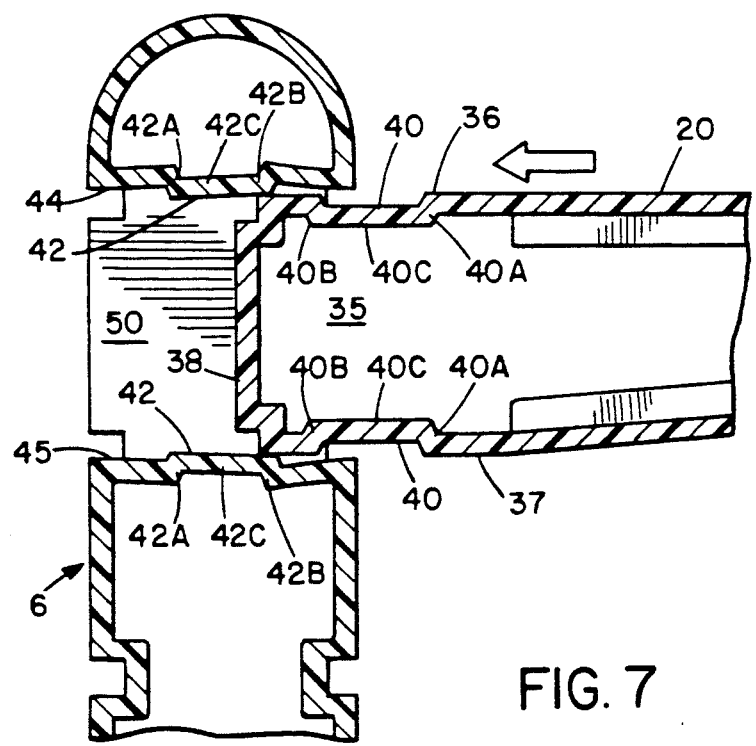
FIG. 7 is a view similar to FIG. 5, showing the initial insertion of a keyboard bridge plug into a leg socket.

FIG. 7 depicts the engagement of plug 35 with socket 50. Because these components are preferably constructed by blow-molding a resilient but flexible material (such as a-b-s resin plastic), resulting in hollow components with rigid but flexible walls, plug 35 can be pressed into socket 50 by pressing keyboard bridge 20 downward onto leg 6, then repeating these steps to form a connection between bridge 20 and leg 5.

When plug 35 is fully seated within socket 50, each engagement ridge 42 therein will be securely seated within a corresponding depression 40 in each plug 35. The engagement of ridge 42 with depression 40 will, therefore, resist lateral movement of the keyboard support. Further, when a keyboard or other load is placed onto keyboard support 20, the downward pressure of plug 35 onto socket end wall 60 will prevent horizontal movement of the support.

To disassemble the stand by detaching the snaps, keyboard bridge 20 may be rocked from side to side or in rotation, preferably with the stand resting on its side on a leg. Because of the flexibility of the walls of plug 35 and socket 50, this motion will, when the keyboard support is pulled away from the leg (the leg being secured in place by, for example, stepping downward on it), free engagement ridge(s) 42 from depression(s) 40, allowing the plug to be removed from the socket. In the preferred embodiment of the invention described above, both assembly and disassembly of the stand can be accomplished by a single person without a great deal of force.

Having set forth the specific embodiment in detail, it will be apparent that there are many alterations and variations that may be made without departing from the spirit of the invention, which should be understood and interpreted solely by the appended claims.

Having described my invention,

I claim:

1. A keyboard stand comprising:

a pair of legs having proximal and distal ends, said legs being substantially hollow and formed of a rigid, flexible material; and at least one pair of support arms extending horizontally in the same direction from the proximal ends of said legs; and a keyboard bridge extending horizontally between and connecting said legs;

said connection being made by a plug and socket reflex fastener;

said plug having first and second end walls extending in the same direction from either end of at least one sidewall;

said plug side wall having one or more depressions formed therein, said depression having first and second side walls and a face extending between said side walls;

said depression side walls extending upwardly from said face at equal angles thereto; and, a socket, said socket being a void in a component of said load-bearing structure defined by first and second end walls bounding either end of a pair of side walls, at least one of said side walls of said socket having one or more engagement ridges formed therein, said engagement ridges corresponding in size, position and number to said depressions in said plug;

said engagement ridges further having first and second sidewalls and a face extending between said side walls; and, said first and second side walls of said engagement ridges extending downwardly from said face at complementary angles, wherein the angle of extension of said first depression side wall is complementary to the angle of extension of said first ridge side wall.

2. A keyboard stand according to claim 1 wherein the angle of extension of said first depression side wall is any angle between or including 70°-90° from vertical.

3. A keyboard stand according to claim 1 wherein: said first and second plug end walls extend between said side walls at complementary angles thereto;

said first and second socket end walls extend between said pair of side walls at complementary angles thereto;

said angle of extension of said first socket end wall is equal to said angle of extension of said first plug end wall.

4. A keyboard stand according to claim 3 wherein said angle of extension is any angle between or including 70°-90° from vertical.

5. The keyboard stand according to any of claims 1-4 wherein said flexible, rigid material is a-b-s resin plastic.

6. The keyboard stand according to claim 5 wherein said plastic is blow-molded to form said legs.

7. The keyboard stand according to any of claims 1 wherein said keyboard bridge is substantially hollow and formed of a flexible, rigid material.

8. The keyboard stand of claim 7 wherein said flexible, rigid material is a-b-s resin plastic.

9. The keyboard stand of claim 8 wherein the plastic is blow-molded to form said keyboard bridge.

10. The keyboard stand according to any of claims 1-4 wherein said legs are tilted from their distal ends in the direction of extension of said support arms.

11. The keyboard stand according to claim 10 wherein the angle of said tilt is any angle up to or including 20° from vertical.

12. A keyboard stand according to claim 11 wherein the ratio between the total width of said depression face and side walls to the total surface area of said plug side wall is 1:3.

* * * * *

UNITED STATES PATENT AND TRADEMARK OFFICE
CERTIFICATE OF CORRECTION

PATENT NO. : 5,312,076
DATED     : MAY 17, 1994
INVENTOR(S): VLADYMIR ROGOV

It is certified that error appears in the above-indentified patent and that said Letters Patent is hereby corrected as shown below:

Column 6, claim 7, line 11, delete "1" and insert --1-4--;

Signed and Sealed this

Sixth Day of December, 1994

BRUCE LEHMAN

Attest:

Attesting Officer

Commissioner of Patents and Trademarks